United States Patent
Estenne

(10) Patent No.: US 11,878,557 B2
(45) Date of Patent: Jan. 23, 2024

(54) TIRE FOR A HEAVY-DUTY VEHICLE OF CONSTRUCTION PLANT TYPE, PROVIDED WITH A PROTECTIVE REINFORCEMENT HAVING THREE DIFFERENTIATED LAYERS

(71) Applicant: COMPAGNIE GENERALE DES ETABLISSEMENTS MICHELIN, Clermont-Ferrand (FR)

(72) Inventor: Vincent Estenne, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 108 days.

(21) Appl. No.: 17/607,675

(22) PCT Filed: May 13, 2020

(86) PCT No.: PCT/EP2020/063340
§ 371 (c)(1),
(2) Date: Oct. 29, 2021

(87) PCT Pub. No.: WO2020/229543
PCT Pub. Date: Nov. 19, 2020

(65) Prior Publication Data
US 2022/0227175 A1    Jul. 21, 2022

(30) Foreign Application Priority Data

May 14, 2019    (FR) .................................... 1904982

(51) Int. Cl.
*B60C 9/18*    (2006.01)
*B60C 9/28*    (2006.01)
*B60C 9/20*    (2006.01)

(52) U.S. Cl.
CPC ...... *B60C 9/2006* (2013.01); *B60C 2009/209* (2013.01); *B60C 2009/2077* (2013.01); *B60C 2009/2083* (2013.01); *B60C 2200/065* (2013.01)

(58) Field of Classification Search
CPC .... B60C 2009/2016; B60C 2009/2019; B60C 2009/2022
See application file for complete search history.

(56) References Cited

U.S. PATENT DOCUMENTS 5,843,583 A     12/1998   D'Haene et al.
2015/0107741 A1  4/2015   Hasegawa et al.

FOREIGN PATENT DOCUMENTS

EP     2 839 974       2/2015
JP     H 11 278014    10/1999
(Continued)

OTHER PUBLICATIONS

Machine translation of JP 4959413, 2012.*
Machine translation of JP 5523808, 2014.*

*Primary Examiner* — Justin R Fischer
(74) *Attorney, Agent, or Firm* — Cozen O'Connor

(57) ABSTRACT

A radial tire (1) for a heavy-duty vehicle of construction plant type, and to reduce the risk of tire tread separation when running over sharp stones, while at the same time ensuring that the crown reinforcement exhibits good resistance to cracking. The tire (1) has a protective reinforcement (50) having three protective layers (51, 52, 53), comprising metal reinforcers that respectively have a diameter (D1, D2, D3) and are distributed at an axial spacing (P1, P2, P3). According to the invention, with Alpha1, Alpha2 and Alpha3 being the angles of the reinforcers of the respective layers (51, 52, 53) with the circumferential direction, the following relationships are satisfied:

15°≤|Alpha1|≤40°

15°≤|Alpha2|≤40°

(Continued)

$$\text{Alpha1} \ast \text{Alpha2} \leq 0$$

$$35° \leq |\text{Alpha3}| \leq 75°$$

As regards the differences between the angles of the reinforcers of the protective layers, the following relationship in terms of absolute values applies:

$$|(\text{Alpha1} - \text{Alpha3})| \geq 10°$$

$$|(\text{Alpha2} - \text{Alpha3})| \geq 10°.$$

12 Claims, 2 Drawing Sheets

(56) References Cited

FOREIGN PATENT DOCUMENTS

| | | | |
|---|---|---|---|
| JP | 2007-062428 | | 3/2007 |
| JP | 4959413 | * | 6/2012 |
| JP | 5523808 | * | 6/2014 |
| WO | WO2005/014925 | | 2/2005 |
| WO | WO2007/090603 | | 8/2007 |
| WO | WO 2019/058053 | | 3/2019 |

* cited by examiner

TIRE FOR A HEAVY-DUTY VEHICLE OF CONSTRUCTION PLANT TYPE, PROVIDED WITH A PROTECTIVE REINFORCEMENT HAVING THREE DIFFERENTIATED LAYERS

RELATED APPLICATIONS

This is a U.S. National Phase Application under 35 USC 371 of International Application PCT/EP2020/063340 filed on May 13, 2020.

This application claims the priority of French application no. FR 1904982 filed Mar. 29, 2019, the entire content of all of which is hereby incorporated by reference.

FIELD OF THE INVENTION

The subject of the present invention is a radial tire intended to be fitted to a heavy-duty vehicle of construction plant type, and the invention relates more particularly to the crown reinforcement of such a tire, and, more particularly still, to the protective reinforcement thereof.

BACKGROUND OF THE INVENTION

Typically, a radial tire for a heavy-duty vehicle of construction plant type, within the meaning of the European Tire and Rim Technical Organisation or ETRTO standard, is intended to be mounted on a rim with a diameter at least equal to 25 inches. Although not limited to this type of application, the invention is described for a radial tire of large size, which is intended to be mounted on a dumper, a vehicle for transporting materials extracted from quarries or surface mines, by way of a rim with a diameter at least equal to 49 inches, possibly as much as 57 inches, or even 63 inches.

Since a tire has a geometry exhibiting symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. The circumferential direction is tangential to the circumference of the tire.

In the following text, the expressions "radially inner/ radially on the inside" and "radially outer/radially on the outside" mean "closer to" and "further away from the axis of rotation of the tire", respectively. "Axially inner/axially on the inside" and "axially outer/axially on the outside" mean "closer to" and "further away from the equatorial plane of the tire", respectively, with the equatorial plane of the tire being the plane that passes through the middle of the tread surface and is perpendicular to the axis of rotation.

Generally, a tire comprises a tread intended to come into contact with the ground via a tread surface, the two axial ends of which are connected via two sidewalls to two beads that provide the mechanical connection between the tire and the rim on which it is intended to be mounted.

A radial tire also comprises a reinforcement made up of a crown reinforcement radially on the inside of the tread and a carcass reinforcement radially on the inside of the crown reinforcement.

The carcass reinforcement of a radial tire for a heavy-duty vehicle of construction plant type usually comprises at least one carcass layer comprising generally metal reinforcers that are coated in a polymeric material of the elastomer or elastomeric type that is obtained by blending and is known as a coating compound. A carcass layer comprises a main part that joins the two beads together and is generally wound, in each bead, from the inside of the tire to the outside, around a usually metal circumferential reinforcing element known as a bead wire so as to form a turn-up. The metal reinforcers of a carcass layer are substantially mutually parallel and form an angle of between 85° and 95° with the circumferential direction.

The crown reinforcement of a radial tire for a heavy-duty vehicle of construction plant type comprises a superposition of circumferentially extending crown layers, radially on the outside of the carcass reinforcement. Each crown layer is made up of generally metal reinforcers that are mutually parallel and are coated in a polymeric material of the elastomer or coating compound type.

Among the crown layers, a distinction is usually made between the protective layers, which make up the protective reinforcement and are radially outermost, and the working layers, which make up the working reinforcement and are radially comprised between the protective reinforcement and the carcass reinforcement.

The protective reinforcement, which comprises at least one protective layer, essentially protects the working layers from mechanical or physicochemical attacks, which are likely to spread through the tread radially towards the inside of the tire.

The protective reinforcement often comprises two radially superposed protective layers formed of elastic metal reinforcers that are mutually parallel in each layer and are crossed from one layer to the next, forming angles at least equal to 10° and at most equal to 35° with the circumferential direction.

The working reinforcement, comprising at least two working layers, has the function of belting the tire and conferring stiffness and road holding thereon. It absorbs both mechanical inflation stresses, which are generated by the tire inflation pressure and transmitted by the carcass reinforcement, and mechanical stresses caused by running, which are generated as the tire runs over the ground and are transmitted by the tread. It is also intended to withstand oxidation and impacts and puncturing, by virtue of its intrinsic design and that of the protective reinforcement.

The working reinforcement usually comprises two radially superposed working layers formed of inextensible metal reinforcers that are mutually parallel in each layer and are crossed from one layer to the next, forming angles at most equal to 60°, and preferably at least equal to 15° and at most equal to 45°, with the circumferential direction.

In order to reduce the mechanical inflation stresses that are transmitted to the working reinforcement, it is known practice to dispose a hoop reinforcement radially on the outside of the carcass reinforcement. The hoop reinforcement, the function of which is to at least partially absorb the mechanical inflation stresses, improves the endurance of the crown reinforcement by stiffening the crown reinforcement. The hoop reinforcement can be positioned radially on the inside of the working reinforcement, between the two working layers of the working reinforcement, or radially on the outside of the working reinforcement.

The hoop reinforcement usually comprises two radially superposed hooping layers formed of metal reinforcers that are mutually parallel in each layer and are crossed from one layer to the next, forming angles at most equal to 10° with the circumferential direction.

As regards the metal reinforcers, a metal reinforcer is mechanically characterized by a curve representing the tensile force (in N) applied to the metal reinforcer as a function of the relative elongation (in %) thereof, known as the force-elongation curve. Mechanical tensile characteristics of the metal reinforcer, such as the structural elongation As (in %), the total elongation at break At (in %), the force at break Fm (maximum load in N) and the breaking strength Rm (in MPa) are derived from this force-elongation curve, these characteristics being measured in accordance with the standard ISO 6892 of 1984.

The total elongation at break At of the metal reinforcer is, by definition, the sum of the structural, elastic and plastic elongations thereof (At=As+Ae+Ap). The structural elongation As results from the relative positioning of the metal threads making up the metal reinforcer under a low tensile force. The elastic elongation Ae results from the actual elasticity of the metal of the metal threads making up the metal reinforcer, taken individually, the behaviour of the metal following Hooke's law. The plastic elongation Ap results from the plasticity, i.e. the irreversible deformation beyond the yield point, of the metal of these metal threads taken individually. These various elongations and the respective meanings thereof, which are well known to a person skilled in the art, are described, for example, in the documents U.S. Pat. No. 5,843,583, WO2005/014925 and WO2007/090603.

Also defined, at any point on the stress-deformation curve of a metal reinforcer, is a tensile modulus, expressed in GPa, which represents the gradient of the straight line tangential to the stress-deformation curve at this point. In particular, the tensile modulus of the elastic linear part of the stress-deformation curve is referred to as the tensile elastic modulus or Young's modulus.

Among the metal reinforcers, a distinction is usually made between the elastic metal reinforcers, such as those used in the protective layers, and the inextensible or non-extensible metal reinforcers, such as those used in the working layers.

An elastic metal reinforcer is characterized by a structural elongation As at least equal to 1% and a total elongation at break At at least equal to 4%. Moreover, an elastic metal reinforcer has a tensile elastic modulus at most equal to 150 GPa, and usually between 40 GPa and 150 GPa.

An inextensible metal reinforcer is characterized by a total elongation At, under a tensile force equal to 10% of the force at break Fm, at most equal to 0.2%. Moreover, an inextensible metal reinforcer has a tensile elastic modulus usually between 150 GPa and 200 GPa.

The indentation stiffness of a tire is a physical quantity indicative of the resistance of the crown to perforation when running over an indenter such as a rock, for example, having a size of several tens of centimetres. The lower the indentation stiffness, the better the crown performs in terms of absorbing obstacles.

In order to measure the indentation stiffness of a tire, a test involving running over standardized obstacles is performed. These obstacles are hemispherical-head polars of varying heights and diameters. Typically, the diameter of the polar varies from 0.5 inches to 3 inches, for a height of between 25 mm and 400 mm. The tire is mounted on the rim of a vehicle of the dumper type and inflated. A number of successive passes over the polar are performed, with the height of the polar being progressively increased. The test is ended when, on running over a sufficiently tall polar, the crown of the tire being tested is finally perforated. During the test, a device makes it possible to measure the maximum loads generated at the centre of the wheel. At the end of the test, the loads at the centre of the wheel are represented as a function of the height of the polars. The indentation stiffness corresponds to the variation in vertical load at the centre of the wheel with respect to the variation in height of the polars.

The inventors have observed that, when the tire runs over more or less sharp stones present on the tracks along which dumpers travel, the tread of a tire is frequently subject to cuts that are likely to pass through it radially towards the inside as far as the protective reinforcement, which is well known to slow the spread of the cracks, initiated by the cuts, as far as the working reinforcement. In order to perform this function of slowing cracks, the protective layers are usually made up of elastic metal reinforcers coated in an elastomeric coating compound, affording the advantage of giving the protective reinforcement a certain flexibility, and therefore the ability to deform when running over obstacles such as stones, while at the same time ensuring that the protective reinforcement has sufficient breaking strength.

However, the inventors have observed that, once cuts have appeared in the tread, the latter may separate from the protective reinforcement prematurely. In other words, the protective reinforcement almost entirely blocks the spread of cracks radially towards the inside of the crown reinforcement and allows cracking only at the interface between the tread and the protective reinforcement, potentially leading to premature separation of the tread of the tire, or tread separation.

SUMMARY OF THE INVENTION

The inventors have set themselves an objective of reducing the risk of tread separation of a radial tyre for a heavy-duty vehicle of construction plant type following attacks on the tread when running over sharp stones, such as cuts, while at the same time ensuring that the crown reinforcement exhibits good resistance to cracking.

This objective has been achieved, according to the invention, by a tire for a heavy-duty vehicle of construction plant type, comprising a crown reinforcement radially on the inside of a tread and radially on the outside of a carcass reinforcement. Said crown reinforcement comprises, radially from the outside to the inside, a protective reinforcement and a working reinforcement. Said protective reinforcement comprises at least two protective layers:

a first, radially innermost protective layer, of axial width LP1, comprising elastic metal reinforcers having a tensile elastic modulus at most equal to 150 GPa, which are coated in an elastomeric material, are mutually parallel and form an angle Alpha1 with a circumferential direction (XX') tangential to the circumference of the tire, said reinforcers having a diameter D1 and being distributed at an axial spacing P1;

a second, radially outermost protective layer, of axial width LP3, comprising elastic metal reinforcers having a tensile elastic modulus at most equal to 150 GPa, which are coated in an elastomeric material, are mutually parallel and form an angle Alpha2 with a circumferential direction (XX') tangential to the circumference of the tire, said reinforcers having a diameter D2 and being distributed at an axial spacing P2;

a working reinforcement comprising two working layers respectively comprising metal reinforcers that are coated in an elastomeric material, are mutually parallel, form an angle at least equal to 15° and at most equal to 45° with the circumferential direction (XX'), and are crossed from one working layer to the next;

a third protective layer, referred to below as intermediate protective layer, of axial width LP2, being interposed between the radially innermost protective layer and radially outermost protective layer and being in contact therewith, said intermediate protective layer comprising elastic metal reinforcers having a tensile elastic modulus at most equal to 150 GPa, which are coated in an elastomeric material, are mutually parallel and form an angle Alpha3 with a circumferential direction (XX') tangential to the circumference of the tire, said reinforcers having a diameter D3 and being distributed at an axial spacing P3;

the angles Alpha1, Alpha2, Alpha3 of the radially innermost protective layer (51), the radially outermost protective layer (52) and the intermediate protective layer (53), respectively, satisfying the following relationships:

$15° \leq |Alpha1| \leq 40°$ $15° \leq |Alpha2| \leq 40°$ Alpha1*Alpha2≤0

$35° \leq |Alpha3| \leq 75°$;

the differences between angles of the reinforcers of the protective layers with the circumferential direction (XX') in terms of absolute values satisfying the following relationships:

$|(Alpha1-Alpha3)| \geq 10°$ $|(Alpha2-Alpha3)| \geq 10°$.

Generally, the protective reinforcement of the construction plant vehicle tires considered here have two protective layers, but the invention proposes interposing a third protective layer between the two initial layers in order to improve the endurance of the reinforcement with respect to tread separation. The inventors have established the mechanical conditions required for the invention to function correctly by establishing relationships between the angles of the reinforcers of the protective layers with the circumferential direction (XX').

According to the invention, the angles Alpha1, Alpha2, Alpha3 of the radially innermost protective layer, the radially outermost protective layer and the intermediate protective layer, respectively, satisfy the following relationships:

$15° \leq |Alpha1| \leq 40°$

Alpha2*Alpha1≤0

$35° \leq |Alpha3| \leq 75°$

The first two relationships attribute an angle Alpha1 to the radially innermost protective layer, and the angle of opposite sign Alpha2 to the radially outermost protective layer. The intermediate protective layer radially interposed between the two preceding layers has a more open angle Alpha3, that is to say an angle with a value of between 35° and 75°. This stack of the protective layers is intended to reduce the risk of tread separation of the tire following attacks on the tread when running over sharp stones, such as cuts, while at the same time ensuring that the crown reinforcement exhibits good resistance to cracking. The disposition of the angles as described above has the advantage of limiting cleavage shear. The addition of the third protective layer contributes to obtaining a level of indentation stiffness that allows the crown to deform so as to absorb the obstacles on tracks.

Also according to the invention, the differences between angles of the reinforcers of the protective layers with the circumferential direction XX' in terms of absolute values satisfy the following relationships:

$|(Alpha1-Alpha3)| \geq 10°$ $|(Alpha2-Alpha3)| \geq 10°$

The angular differences greater than 10° between the intermediate protective layer and the two other, adjacent protective layers are intended to space apart the reinforcers of the layers by limiting the points of contact from one layer to the other. This disposition contributes to improving the resistance of the crown to oxidation. More specifically, if the reinforcers of one layer are affected by an oxidation attack, limiting the points of contact between layers prevents the oxidation from spreading to the other, adjacent layers.

Advantageously, the distributed breaking tension in extension of each protective layer is greater than or equal to 100 daN/mm.

According to one preferred embodiment of the elastic metal reinforcers, the elastic metal reinforcers of the protective layers are multistrand ropes of structure 1×N comprising a single layer of N strands wound in a helix, each strand comprising an internal layer of M internal threads wound in a helix and an external layer of K external threads wound in a helix around the internal layer. This type of structure gives the reinforcer an elastic behaviour as defined above.

The assembly of the rope depends on the position of the protective layer in the stack. For example, for the radially outermost protective layer, an assembly in which 4×(1+5)×0.26 is selected. This means that the rope results from the assembly of 4 strands wound in a helix. Each strand is formed of an internal layer of 1 thread wound in a helix and of an external layer of 5 threads wound in a helix around the internal layer. The threads have a diameter of 26 hundredths of a millimetre. The breaking force of such an assembly is around 250 daN. The breaking tension of the protective layer is derived therefrom as a function of the spacing of the reinforcers, which, at 2.5 mm, gives a breaking tension greater than or equal to 100 daN/mm.

For the elastic metal reinforcers of the radially innermost protective layer, the assembly selected is 4×(4+9)×0.26. This rope is formed of the winding in a helix of 4 strands, each of which is made up of an internal layer of 4 threads wound in a helix and of an external layer of 9 threads wound in a helix around the latter. The threads have a diameter of 26 hundredths of a millimetre. With this rope, for reinforcer spacings of 3.7 mm, the breaking tension of the protective layer is greater than or equal to 100 daN/mm.

More advantageously, the reinforcers of the protective layer interposed between the other protective layers are identical to those of the radially outermost protective layer.

In a simplified embodiment of the invention associated with the standardization of the manufacture of the tire which aims to limit the number of components for producing the tire, the reinforcers of the intermediate protective layer are identical to those of the radially outermost protective layer. In reality, only the angles that the reinforcers make with the circumferential direction and their axial widths differ between these two protective layers.

Preferably, the angle Alpha3 of the reinforcers of the protective layer interposed between the radially innermost protective layer and the radially outermost protective layer with the circumferential direction is equal to −45°.

More preferably, the angles Alpha1 and Alpha2 of the reinforcers of the radially innermost protective layer and radially outermost protective layer, respectively, are equal to 33° and −33°, respectively.

Generally, the protective reinforcement is formed of two layers crossed at opposite angles so as to form a protective grid laid radially on the working layers in the outward direction. The third protective layer introduced by the invention is interposed between the two crossed protective layers. The combination of the angles Alpha3 at −45°, Alpha1 at 33°, and Alpha2 opposite to Alpha1 provides optimal functioning of the invention that is observable in the results of finite-element calculations for evaluating the cleavage deformations, and in the measurement results of the indentation stiffnesses.

In one embodiment of the invention, the axial width LP2 of the interposed protective layer is such that LP2≤Min (LP1).

In this configuration in which the axial width of the second protective layer LP3 is shorter than the axial widths of the two adjacent protective layers LP1 and LP2, the difference in length "LP2-LP3" needs to be sufficient with a value at least equal to 7 mm to avoid the interference of the second protective layer in the coupling of the two crossed layers. However, the width LP3 needs to be sufficient to cover the central part of the tread.

In another embodiment of the invention, the respective axial distances LP1, LP2, LP3 of the three respective protective layers satisfy the relationship LP3≤LP2≤LP1.

In this embodiment of the invention, the widths of the protective layers LP1, LP2 and LP3 decrease from the inside of the tire to the outside in the radial direction. The crown is attacked mainly at the centre of the tread, this validating this disposition of the protective layers, which ensures the protection of the centre of the tread. However, the axial ends of the protective layers do not need to coincide. The inventors propose an offset of at least 7 mm in the axial direction from one protective layer to the other at each axial end.

According to one preferred embodiment of the crown reinforcement, the radially innermost protective layer has an axial width LP1 at least equal to 1.05 times and at most equal to 1.25 times the axial width LT1 of the radially innermost working layer.

Below 1.05 times the axial width LT1, the radially innermost protective layer does not protrude sufficiently with respect to the radially innermost working layer to be able to afford the latter sufficient protection against hammering. Above 1.25 times the axial width LT1, the axial end of the radially innermost protective layer is very close to the axial end of the tread, thereby increasing the risk of cracking between the axial end of said protective layer and the axial end of the tread.

Preferably, the elastic metal reinforcers of the radially innermost protective layer and radially outermost protective layer, respectively, satisfy the following relationships:

$D1 \geq D2$ $P1 \geq P2$ $P1 \geq 1.2*D1$ and $P2 \geq 1.2*D2$ $2.3 \leq (D1*P1)/(D2*P2) \leq 5$ The radially innermost protective layer, which protrudes with respect to the radially innermost working layer, comprises reinforcers having a diameter D1 greater than the diameter D2 of the reinforcers of the radially outermost protective layer, and which are distributed with an axial spacing P1 greater than the axial spacing P2 separating the reinforcers of the radially outermost protective layer. In other words, the protective reinforcement is made up of a radially innermost protective layer with large-diameter reinforcers and a radially outermost protective layer with small-diameter reinforcers.

The radially outermost protective layer with small-diameter reinforcers makes it possible to prevent the crack, generated by cuts in the tread, from being blocked radially towards the inside of the protective reinforcement. Specifically, reinforcers with too large a diameter, which are therefore too stiff, encourage blocking of radial cracking, leading the crack to spread at the radially outer surface of the radially outermost protective layer, generating the formation of pockets of cracking, then causing the pockets of cracking thus formed to join up, potentially ultimately leading to separation between the tread and the protective reinforcement. Selecting a reinforcer diameter that is sufficiently small makes it possible to avoid this disadvantage and allow at least partial radial spreading of the cracks towards the radially innermost protective layer.

Furthermore, a radially innermost protective layer with large-diameter reinforcers makes it possible, for the one part, to block radial cracking in the direction of the working reinforcement, which is particularly harmful from the point of view of the endurance of the crown reinforcement and, for the other part, to compensate for the lower stiffness of the radially outermost protective layer comprising smaller reinforcers, and therefore to ensure that the protective reinforcement has sufficient stiffness overall.

In addition, for each protective layer, the axial spacing between two consecutive reinforcers needs to be greater than 1.2 times the reinforcer diameter, both to ensure satisfactory bonding, and therefore good anchorage, with the elastomeric compounds radially in contact with said protective layer, and to avoid any contact between the reinforcers and, therefore, to reduce the associated risk of the spreading of corrosion.

Finally, the ratio (D1*P1)/(D2*P2) between the inter-reinforcement sections D1*P1 of the radially innermost protective layer, characterized by a radial thickness D1 and an axial width P1, and, respectively, D2*P2 of the radially outermost protective layer, characterized by a radial thickness D2 and an axial width P2, needs to be within a determined range of values. Below the lower end-point of this range of values, which is equal to 2.3, either the risk of cracking at the axial end of the radially innermost protective layer becomes excessively high (in the case where the inter-reinforcement section D1*P1 is too small), or the risk of radial cracking spreading through the radially outermost protective layer becomes too high (in the case where the inter-reinforcement section D2*P2 is too high). Above the upper end-point of this range of values, which is equal to 5, either the spread of radial cracking through the radially innermost protective layer in the direction of the working reinforcement becomes excessive (in the case where the inter-reinforcement section D1*P1 is too high), or the spread of cracking at the radially outer surface of the radially outermost protective layer becomes excessive, with an increased risk of tread separation (in the case where the inter-reinforcement section D2*P2 is too small).

Preferably, the elastic metal reinforcers of the radially innermost protective layer have a diameter D1 at least equal to 3 mm, preferably at least equal to 3.5 mm. A minimum diameter D1, equal to 3 mm, for the reinforcers of the radially innermost protective layer provides effective blocking of radial cracking in the direction of the working reinforcement and a sufficient overall level of stiffness of the protective reinforcement.

Also preferably, the elastic metal reinforcers of the radially outermost protective layer have a diameter D2 at most equal to 2.5 mm. A maximum diameter D2, equal to 2.5 mm, for the reinforcers of the radially outermost protective layer makes it possible to avoid complete blocking of radial cracking in the direction of the working reinforcement and therefore exclusively surface-spreading of cracks that could lead to tire tread separation.

According to one preferred embodiment of the crown reinforcement, the crown reinforcement comprises a hoop reinforcement comprising two hooping layers, the respective metal reinforcers of which, which are coated in an elastomeric material, are mutually parallel and form an angle at most equal to 10° with the circumferential direction, are crossed from one hooping layer to the next. A distinction is usually made between angled hooping layers, with reinforcers that form angles at least equal to 6° and at most equal to 8°, and circumferential hooping layers, with reinforcers that are substantially circumferential and form angles close to 0° and at most equal to 5°. The metal reinforcers of the hooping layer may be either elastic or inextensible. The hoop reinforcement may be positioned radially on the inside of the working reinforcement, between the two working layers of the working reinforcement, or radially on the outside of the working reinforcement.

BRIEF DESCRIPTION OF THE DRAWINGS

The features of the invention are illustrated in the schematic FIGS. 1 and 2, which are not to scale, with reference to a tire of size 53/80R63.

DETAILED DESCRIPTION OF THE DRAWINGS

Figure 1:
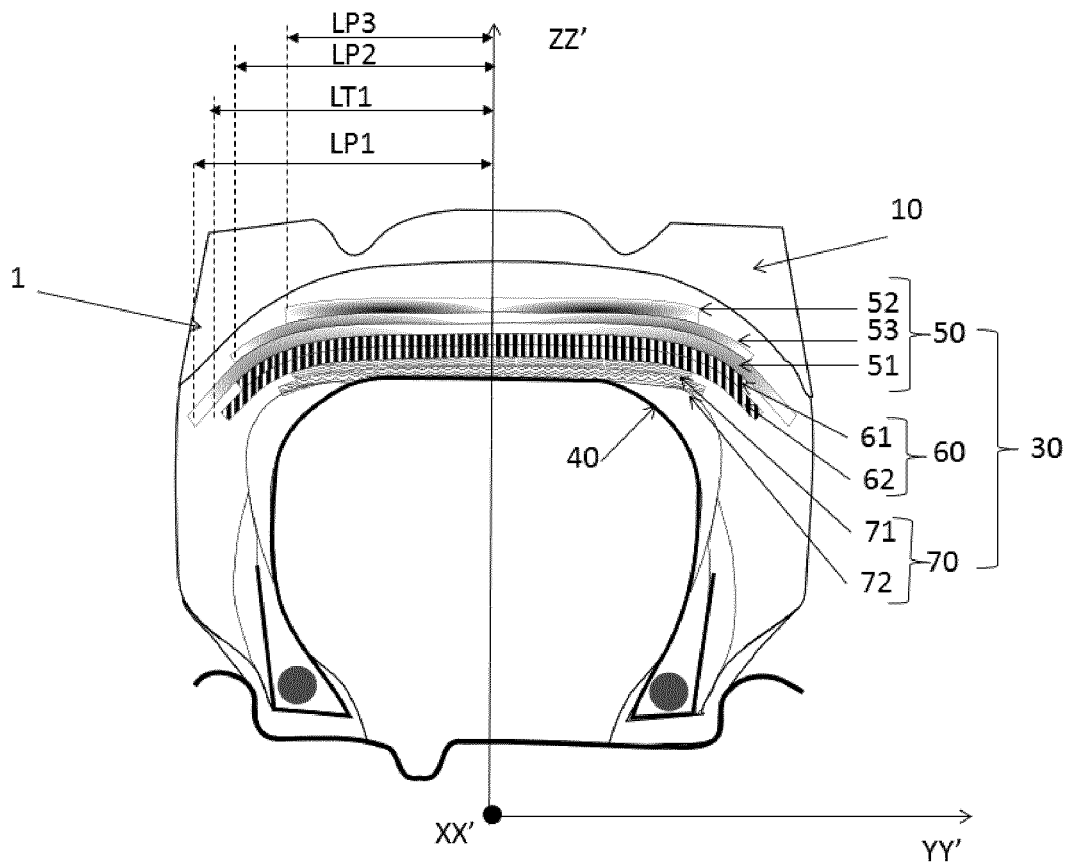
FIG. 1 is a meridian cross section through a crown of a tire for a heavy-duty vehicle of dumper type according to the invention.

FIG. 1 shows a meridian cross section through a tire 1 for a heavy-duty vehicle of construction plant type of size 53/80R63, comprising a crown reinforcement 30 radially on the inside of a tread 10 and radially on the outside of a carcass reinforcement 40. The crown reinforcement 30 comprises, radially from the outside to the inside, a protective reinforcement 50, a working reinforcement 60 and a hoop reinforcement 70. The protective reinforcement 50 comprises three protective layers (51, 52, 53), respectively, containing elastic metal reinforcers that are coated in an elastomeric material, are mutually parallel and form angles Alpha1, Alpha2, Alpha3, respectively, with a circumferential direction (XX') tangential to the circumference of the tire. In the case illustrated here, the angles have the respective values (33°, −33°, −45°). The working reinforcement 60 comprises two working layers (61, 62), the respective metal reinforcers of which, which are inextensible, are coated in an elastomeric material, are mutually parallel and form angles respectively equal to 24°, in the case of the radially innermost working layer 61, and −24°, in the case of the radially outermost working layer 62, with the circumferential direction (XX'). The radially innermost protective layer 51 protrudes axially with respect to the radially innermost working layer 61, meaning that the radially innermost protective layer 51 has an axial width LP1 greater than the axial width LT1 of the radially innermost working layer 61. The intermediate protective layer has a width LP2 less than or equal to (LP1−7 mm) in the case considered here, and the radially outermost protective layer 52 has an axial width LP3 less than or equal to the axial width (LP2−7 mm). The hoop reinforcement 7 comprises two hooping layers (71, 72), the respective metal reinforcers of which, which are coated in an elastomeric material, are mutually parallel and form an angle of between 6° and 10° with the circumferential direction XX', are crossed from one hooping layer to the next.

Figure 2:
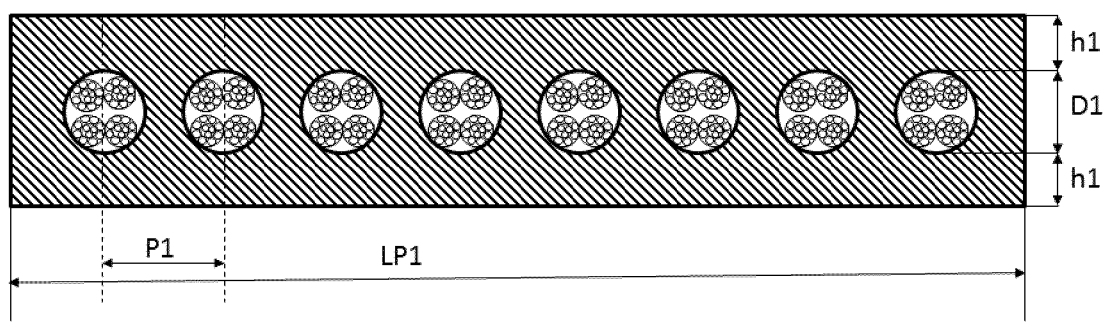
FIG. 2 is a meridian cross section through a portion of a protective reinforcement according to the invention.

FIG. 2 shows a meridian cross section through the protective layer 51, or (52, 53), respectively, having reinforcers with a diameter D1, or (D2, D3), respectively, and a spacing P1, or (P2, P3), respectively. The radially innermost protective layer 51 comprises large elastic metal reinforcers having a large diameter D1, advantageously at least equal to 3 mm, which are distributed axially at an axial spacing P1 at least equal to 1.2*D1, the axial spacing being the axial distance between the respective centres of the circular cross sections of two consecutive reinforcers. The radially outermost protective layer 52 comprises small elastic metal reinforcers having a small diameter D2, advantageously at most equal to 2.5 mm, which are distributed axially at an axial spacing P2 at least equal to 1.2*D1. The inter-reinforcer sections of the radially innermost protective layer 51 and of the radially outermost protective layer, respectively, are respectively equal to D1*P1, D1 being the radial thickness and P1 being the axial width of the section, and to D2*P2, D2 being the radial thickness and P2 being the axial width of the section. The intermediate protective layer 53, interposed between the radially innermost protective layer 51 and the radially outermost protective layer 52, has the same reinforcers as the radially outermost protective layer 52. There is therefore D3, which is equal to D2, and P3, which is equal to P2. The angles of the reinforcers of the layers 52 and 53 with the circumferential direction (XX') are different, as are their axial widths LP2 and LP3.

Figure 3:
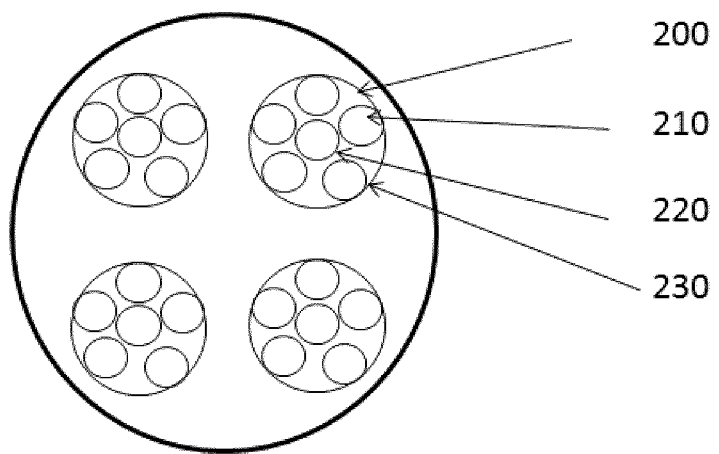
FIG. 3 is an illustration of the assembly of a rope as used in the invention.

FIG. 3 shows the assembly of a rope as used in the invention for producing the protective layers. The rope comprises 4 strands 200 wound in a helix, each strand being made up of an internal layer 220 of one thread, surrounded by an external layer 230 formed of 4 threads 210 wound around the internal layer.

The inventors compared a tire I according to the invention against a reference tire R of the same size 53/80R63. The reference tire is a conventional solution in the prior art with a protective reinforcement comprising two protective layers, while the tire of the invention has a protective reinforcement that comprises three protective layers, the angles of which are distributed as claimed in the invention.

Table 1 below gives the technical characteristics of the reference tire R and of the tire I according to the invention, respectively, of the size 53/80R63 studied:

TABLE 1

| Crown layers for the size 53/80R63 | Characteristics | Reference tire R | Tire I according to the invention |
|---|---|---|---|
| Radially innermost protective layer 51 | Type of reinforcer R1 | 52.26 = 4 * (4 + 9) * 26 | 52.26 = 4 * (4 + 9) * 26 |
| | Tensile elastic modulus M1 of a reinforcer | 67 GPa | 67 GPa |
| | Force at break Fm1 of a reinforcer | 605 daN | 605 daN |
| | Diameter D1 of a reinforcer | 3.1 mm | 3.1 mm |
| | Axial spacing P1 between reinforcers | 3.7 mm | 3.7 mm |
| | Angle Alpha1 of the reinforcers, with respect to XX' | 33° | 33° |
| | Force at break Rm1 of the protective layer | 1635 N/mm | 1635 N/mm |
| | Axial width LP1 of the protective layer | 1190 mm | 1190 mm |
| Radially outermost protective layer 52 | Type of reinforcer R2 | 24.26 = 4 * (1 + 5) * 26 | 24.26 = 4 * (1 + 5) * 26 |
| | Tensile elastic modulus M2 of a reinforcer | 77 GPa | 77 GPa |
| | Force at break Fm2 of a reinforcer | 255 daN | 255 daN |
| | Diameter D2 of a reinforcer | 1.9 mm | 1.9 mm |
| | Axial spacing P2 between reinforcers | 2.5 mm | 2.5 mm |
| | Angle Alpha2 of the reinforcers, with respect to XX' | −33° | −33° |
| | Force at break Rm2 of the protective layer | 1060 N/mm | 1060 N/mm |
| | Axial width LP2 of the protective layer | 956 mm | 956 mm |
| Protective reinforcement 50 | Ratio of the inter-reinforcer sections D1*P1/D2*P2 | 3.1 * 3.7/1.9 * 2.5 = 2.41 | 3.1 * 3.7/1.9 * 2.5 = 2.41 |
| Third protective layer 53, interposed between 51 and 52 | Alpha 3 | N/A | −45° |
| Working reinforcement 60 | Axial width LT1 of the radially innermost working layer 61 | 1060 mm | 1060 mm |

The tire of the invention differs from the reference tire by the presence of the third protective layer interposed between the first, radially innermost protective layer and the second, radially outermost protective layer, and also by the relationships between the angles of the reinforcers of each layer with the circumferential direction. The third protective layer uses reinforcers identical to those of the radially outermost protective layer, but the width of the third layer and the orientation of these reinforcers with the circumferential direction may be different from those of the second protective layer.

The characteristics of the tire according to the invention clearly meet the essential conditions of the invention with the combination of the following angles:

Alpha1=33°

Alpha2=−33°

Alpha3=−45°

Hence:

$$15° \leq |Alpha1| \leq 40°$$

$$15° \leq |Alpha2| \leq 40°$$

$$Alpha1*Alpha2 \leq 0$$

$$35° \leq |Alpha3| \leq 75°$$

And in respect of the differences between angles of the reinforcers of the protective layers with a circumferential direction, the relationship in terms of absolute values is also satisfied:

$$|(Alpha1-Alpha3)| \geq 10°$$

$$|(Alpha2-Alpha3)| \geq 10°.$$

More specifically, for the tire according to the invention, the radially innermost protective layer has an axial width LP1 equal to 1190 mm, 130 mm greater than the axial width LT1 of the radially innermost working layer. The elastic metal reinforcers of the radially innermost protective layer are multistrand ropes with a 4×(4+9)×0.26 assembly, meaning that they are made up of 4 strands, each strand comprising an internal layer of 4 internal threads and an external layer of 9 external threads wound in a helix around the internal layer, the threads having a section of diameter d=0.26 mm.

In addition, the elastic metal reinforcers of the radially innermost protective layer have a tensile elastic modulus equal to 67 GPa, a force at break equal to 605 daN, a diameter D1 equal to 3.1 mm, and are axially distributed at an axial spacing P1 equal to 3.7 mm, and form an angle Alpha1 equal to 33° with the circumferential direction XX'.

The elastic metal reinforcers of the radially outermost protective layer are multistrand ropes with a 4×(1+5)×0.26 structure, meaning that they are made up of 4 strands, each strand comprising an internal layer of 1 internal thread and an external layer of 5 external threads wound in a helix around the internal layer, the threads having a section of diameter 0.26 mm.

The elastic metal reinforcers of the radially outermost protective layer have a tensile elastic modulus equal to 77 GPa, a force at break equal to 255 daN, a diameter D2 equal to 1.9 mm, and are axially distributed at an axial spacing P2 equal to 2.5 mm, and form an angle Alpha2 of −33° with the circumferential direction XX'.

Still for the tire of the invention, the intermediate protective layer 53 has the same reinforcers as the radially outermost protective layer, i.e. multistrand ropes with a 4×(1+5)×0.26 structure, made up of 4 strands, each strand comprising an internal layer of 1 internal thread and an external layer of 5 external threads wound in a helix around the internal layer, the threads having a section of diameter 0.26 mm. By contrast, these reinforcers make an angle Alpha3 of −45° with the circumferential direction XX'.

The inventors have shown, by way of finite-element calculations, that the resistance of the tire to tread separation following cuts to the tread has been improved. The addition of the third protective layer with elastic reinforcers contributes to defining a protective reinforcement that is deformable so as to absorb the obstacles on tracks run on, without severing the reinforcers. Furthermore, the appropriate choice of the reinforcers makes it possible to arrive at a balanced compromise between the indentation stiffnesses and radial stiffnesses in order to carry more loads with increased endurance, without tread separation.

The inventors simulated the test of pressing the polar into the crown of the tire as described in paragraph [0024]. The depth of indentation upon breakage of the first protective layer was compared between the reference tire and the tire of the invention. The improvement in the depth of indentation is 12% better with the tire of the invention.

Cleavage shear in the meridian and circumferential planes is substantially at the same level for the reference tire and the tire of the invention. The additional protective layer has therefore not brought about any worsening of shear at the axial ends of the crown and protective layers.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a heavy-duty civil engineering vehicle, comprising:
   a crown reinforcement radially disposed on an inside of a tread and radially arranged on an outside of a carcass reinforcement, the crown reinforcement comprising, radially from the outside to the inside, a protective reinforcement and a working reinforcement, said protective reinforcement comprising a plurality of protective layers formed by a first, radially innermost protective layer having a width along an axial direction LP1 and including elastic metal reinforcers having a tensile elastic modulus at most equal to 150 GPa, which are coated in an elastomeric material, are mutually parallel and form an angle Alpha1 with a circumferential direction tangential to the circumference of the tire, said elastic metal reinforcers of the first, radially innermost protective layer having a diameter D1 and being distributed at an axial spacing P1, said protective reinforcement further comprising a second, radially outermost protective layer having another width along the axial direction LP3 and including elastic metal reinforcers having a tensile elastic modulus at most equal to 150 GPa, which are coated in an elastomeric material, are mutually parallel and form an angle Alpha2 with a circumferential direction tangential to a circumference of the tire, said elastic metal reinforcers of the second, radially outermost protective layer having a diameter D2 and being distributed at an axial spacing P2, and the working reinforcement comprising a plurality of working layers respectively comprising metal reinforcers which are coated in an elastomeric material, are mutually parallel, form an angle at least equal to 15° and at most equal to 45° with the circumferential direction, and are crossed from one working layer to the next;
   wherein a third protective layer, which forms an intermediate protective layer having a further width along the axial direction LP2, is interposed between the first radially innermost protective layer and the second radially outermost protective layer and is in contact therewith, said intermediate protective layer comprising elastic metal reinforcers having a tensile elastic modulus at most equal to 150 GPa, which are coated in an elastomeric material, are mutually parallel and form an angle Alpha3 with a circumferential direction tangential to the circumference of the tire, said elastic metal reinforcers having a diameter D3 and being distributed at an axial spacing P3;

wherein the angles Alpha1, Alpha2, Alpha3 of the first, radially innermost protective layer, the second, radially outermost protective layer and the intermediate protective layer, respectively, satisfy the following relationships:

$$15° \leq |Alpha1| \leq 40°$$

$$15° \leq |Alpha2| \leq 40°$$

$$Alpha1 * Alpha2 \leq 0$$

$$35° \leq |Alpha3| \leq 75°;\ and$$

wherein differences between angles of the elastic metal reinforcers of the protective layers with the circumferential direction in terms of absolute values satisfy the following relationships:

$$|(Alpha1 - Alpha3)| \geq 10°$$

$$|(Alpha2 - Alpha3)| \geq 10°.$$

2. The tire according to claim 1, wherein a distributed breaking tension in an extension of each protective layer is greater than or equal to 100 daN/mm.

3. The tire according to claim 1, wherein the reinforcers of the intermediate protective layer interposed between the first, radially innermost protective layer and the second, radially outermost protective layer are identical to those of the second, radially outermost protective layer.

4. The tire according to claim 1, wherein the angle Alpha3 of the reinforcers of the intermediate protective layer with the circumferential direction is equal to −45°.

5. The tire according to claim 4, wherein the values of the angles Alpha1 and Alpha2 are 33° and −33°, respectively.

6. The tire according to claim 1, wherein the further width along the axial direction LP2 of the intermediate protective layer is such that LP2≤Min (LP1).

7. The tire according to claim 1, wherein the respective axial distances LP1, LP2, LP3 of the respective protective layers satisfy the relationship LP3≤LP2≤LP1.

8. The tire according to claim 1, wherein the width along the axial direction LP1 of the first, radially innermost protective layer is at least equal to 1.05 times and at most equal to 1.25 times the a different width along an axial direction LT1 of a radially innermost working layer.

9. The tire according to claim 1, wherein the elastic metal reinforcers of the first, radially innermost protective layer and second, radially outermost protective layer, respectively, satisfy the following relationships:

$$D1 \geq D2$$

$$P1 \geq P2$$

$$P1 \geq 1.2*D1 \text{ and } P2 \geq 1.2*D2$$

$$2.3 \leq (D1*P1)/(D2*P2) \leq 5$$

10. The tire according to claim 1, wherein the elastic metal reinforcers of the radially innermost protective layer have a diameter D1 at least equal to 3 mm.

11. The tire according to claim 1, wherein the elastic metal reinforcers of the radially outermost protective layer have a diameter D2 at most equal to 2.5 mm.

12. The tire according to claim 1, wherein the crown reinforcement further comprises a hoop reinforcement comprising two hooping layers, the metal reinforcers of which, which are coated in an elastomeric material and are mutually parallel, form an angle at most equal to 10° with the circumferential direction.

* * * * *